United States Patent [19]

Houle et al.

[11] Patent Number: 4,988,543
[45] Date of Patent: Jan. 29, 1991

[54] PROCESS FOR INCORPORATION OF A PHASE CHANGE MATERIAL INTO GYPSUM WALLBOARDS AND OTHER AGGREGATE CONSTRUCTION PANELS

[75] Inventors: Jean-Francois Houle, St. Hyacinthe; Jean Paris, Montreal, both of Canada

[73] Assignee: Ecole Polytechnique, Montreal, Canada

[21] Appl. No.: 411,642

[22] Filed: Sep. 25, 1989

[51] Int. Cl.⁵ .......................... B05D 1/02; B05D 3/02
[52] U.S. Cl. ................................ 427/372.2; 118/324; 427/424; 428/703
[58] Field of Search ..................... 118/324; 427/372.2, 427/424; 428/703

[56] References Cited

U.S. PATENT DOCUMENTS 4,259,401 3/1981 Chahroudi et al. ............. 252/62 X
4,797,160 1/1989 Salyer .......................... 106/18.25 X Primary Examiner—Michael Lusignan

[57] ABSTRACT

A method and an apparatus for impregnating one side of a porous board, such as gypsum boards, with a precise amount of compatible phase change material. A predetermined amount of the phase change material is applied at a predetermined uniform rate to the one surface of the board so that a predetermined amount of the phase change is impregnated. The rate of application is lower than the absorption rate of phase change material. Also, the temperature of the board must be above the melting point of the phase change material during the impregnation. The process and apparatus may be either a continuous, a semi-continuous or a batch operation, and the resulting product is intended as a building construction material.

7 Claims, 2 Drawing Sheets

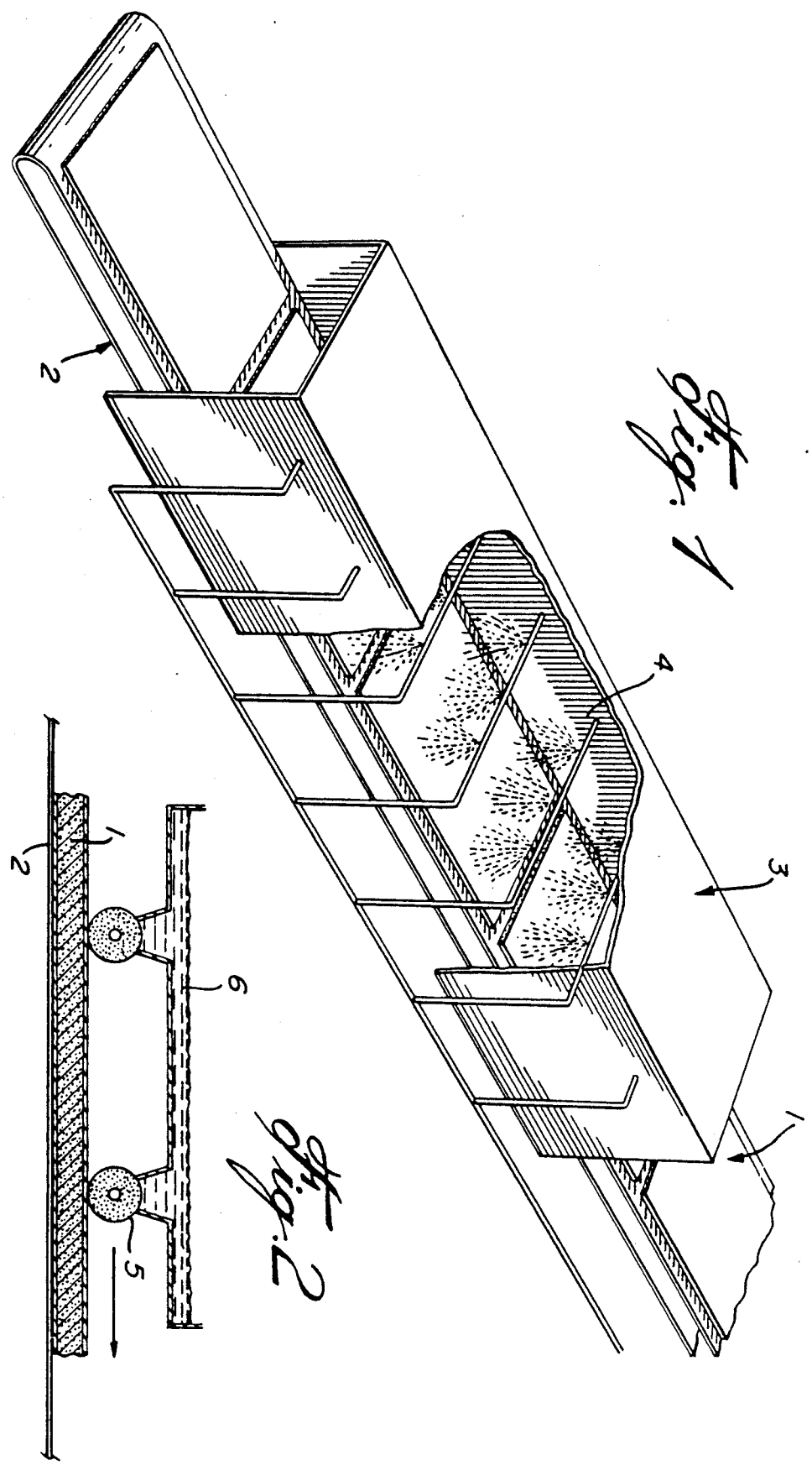

PROCESS FOR INCORPORATION OF A PHASE CHANGE MATERIAL INTO GYPSUM WALLBOARDS AND OTHER AGGREGATE CONSTRUCTION PANELS

BACKGROUND OF INVENTION

1. Field of Invention

The present invention relates to a method and apparatus for impregnating one side of a porous board, such as a gypsum board, with a precise amount of compatible phase change material. The invention also relates to a gypsum board having a single surface impregnated, substantially uniformly, with a compatible accurate amount of phase change material to increase the thermal capacity of the board.

2. Description of Prior Art

It is desirable to increase the thermal inertia of the envelope of buildings, rooms and other spaces to facilitate temperature control and to allow utilization of short duration energy sources on a longer period. For instance, during the heating season, thermal inertia stores excess solar heat reducing overheating and restores the heat at night reducing the heating demand. Therefore, an increase of the thermal inertia facilitates energy conservation. During the cooling season low cost electricity or natural cooling can be used at night to store cooling using the high thermal inertia and reducing the cooling demand of the following cooling period. Also thermal inertia reduces inside temperature variations improving comfort for the occupants.

Thermal inertia can be increased by increasing the inside mass of spaces using, for instance, heavy masonry walls. Another method is to incorporate to construction materials or components products that melt and solidify at or near the space comfort zone. Those products store a great deal of energy within a slight temperature variation during the phase change without using a large volume of these products and add only little weight to the spaces. Those products are commonly called Phase Change Materials (PCM).

Thermal inertia in spaces can be increased by incorporating a PCM to the materials used to cover the inside surface of walls and ceilings (gypsum wallboard, ceiling tiles, etc.). There are major advantages to this including a large surface area for heat transfer between the PCM and the inside air, a close contact between the storage medium and the air to cool or heat, a uniform air temperature because air is surrounded by the storage medium, storage is added without utilization of useful volume, and there is no additional cost for storage medium installation during construction. The storage medium is invisible to users and does not require any control device (passive temperature regulation).

A board, such as a gypsum wallboard, containing a PCM is described in U.S. Pat. No. 4,797,160 by Salyer. The PCM choice includes alkyl hydrocarbons having 14 or more carbon atoms and having a transition temperature between 0° C. and 80° C. depending on the utilization envisaged. For occupants comfort the typical transition temperature is around 18° C. to 24° C. There is actually no such product available commercially in part because there is no proven method to incorporate the PCM in a way to obtain an acceptable product Five different methods are known and which have been tried to incorporate PCM into gypsum wall boards. These are:

(i) simultaneous incorporation of macro-capsules of PCM linked together and arranged in a grid and of the gypsum paste between the two finishing papers;

(ii) incorporation of macro-capsules of PCM using grooves made on the backside of dry gypsum wallboards;

(iii) incorporation of small PCM impregnated pellets during the incorporation of the gypsum paste between the finishing papers;

(iv) direct mixing of the PCM with the paste; and (v) dipping of dry wallboards into melted PCM.

It has been observed that incorporation of capsules or pellets may reduce interval binding strength of the boards.

The PCM can be directly mixed with the gypsum paste at concentrations up to 20 percent by weight according to U.S. Pat. No. 4,797,160. A critical step in gypsum wallboard fabrication is the high drying rate of boards to force premixed starch to migrate to the gypsum-paper interface; the starch assures a good adhesion of the paper on the gypsum core. It is expected that over a certain (undetermined) amount of organic PCM in the paste, starch migration rate will be reduced and that adhesion problems will affect the quality of the product.

Finally, PCM can also be incorporated into gypsum wallboards by dipping dry boards into a melted and heated PCM for a certain amount of time. This method is simple but has some drawbacks. Impregnation rate of PCM into gypsum wallboards depends on the temperature of the board, the temperature of the PCM, the porosity of the board, the relative diffusivity of the PCM into gypsum and on the duration of the operation. In a dipping process it is difficult to control all those parameters to obtain a precise amount of PCM impregnation. Another important drawback of this method is that all the volume of the wallboard is impregnated including the face exposed of the board. This changes the appearance of the product and may case problems such as paint peeling, odors, and inflammability could occur.

SUMMARY OF INVENTION

It is a feature of the present invention to provide a method and an apparatus which substantially overcomes all of the above-mentioned disadvantages of the prior art.

Another feature of the present invention is to provide a novel gypsum board which has a single surface thereof impregnated substantially uniformly with a compatible accurate amount of phase change material (PCM) to increase the thermal capacity of the board.

Another feature of the present invention is to provide a method and an apparatus that allows absorption of a precise amount of PCM to porous boards and that permits a control of the fraction of volume impregnated.

The method of the present invention consists in absorbing through one side of the board with the desired amount of PCM. Usually the side through which the absorption is performed is the back surface of the board when installed. Several methods can be used to absorb PCM through one side of the board, the process can be continuous, semi-continuous or in batch.

In a few aspects of the method of the invention the PCM is sprayed uniformly at a lower rate than the absorption rate of the PCM into the board. For a small scale production in batch, the boards are maintained horizontally, a liquid tight border is applied and the desired amount of PCM is added to as to cover the surface. Typical absorption time is 60 seconds.

The board impregnated using this invention is quite different from the board impregnated by dipping The amount of PCM absorbed is known precisely; the PCM is not uniformly distributed in the volume but concentrated in the desired part of the volume, one surface of the board is not affected by the process and looks as the regular product avoiding problems related to adhesion, odors and inflammability. It is expected that absorption through one side is the simplest process that can provide such a product.

According to a still further broad aspect of the present invention there is provided a method of impregnating one side of a porous board with a precise amount of compatible PCM. The method comprises applying a predetermined amount of the PCM at a predetermined rate to the said surface so that a predetermined amount of the PCM is impregnated. This application rate is lower than the absorption rate of the PCM. At least the said one side of the board is at a temperature above the melting point of the PCM during the impregnation.

According to a further broad aspect of the present invention, there is provided an apparatus for impregnating one side of a porous board with a precise amount of compatible PCM. The apparatus comprises means to support the board with the one side facing up. Application means is further provided for applying a predetermined amount of PCM to the said one side in a substantially uniform manner. At least the one side of the board is at a temperature above the melting point of the PCM.

According to a still further broad aspect of the present invention there is provided a gypsum board having a single surface thereof impregnated substantially uniformly with a compatible accurate amount of PCM to increase the thermal capacity of the board.

BRIEF DESCRIPTION OF DRAWINGS

A preferred embodiment of the present invention will now be described with reference to the examples thereof as illustrated in the accompanying drawings in which:

FIG. 1 is a fragmented perspective view showing a method of impregnating one side of the porous board with a compatible phase change material (PCM);

FIG. 2 is a simplified side view showing a modification of the application means of the apparatus of FIG. 1.

DESCRIPTION OF PREFERRED EMBODIMENT

Figure 3:
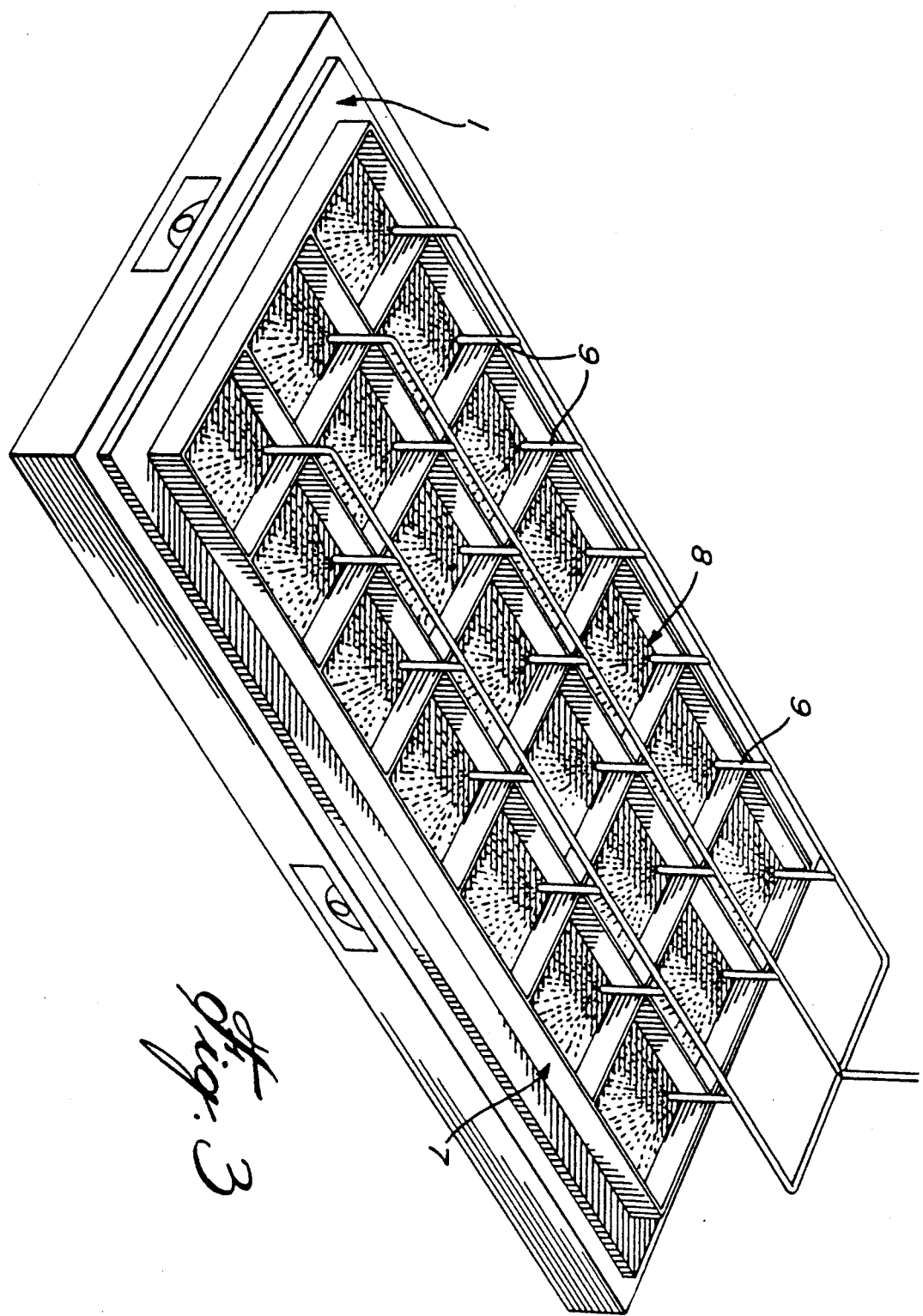
FIG. 3 is a simplified perspective view showing another method of impregnating a porous board with a compatible PCM.

In accordance with the present invention a phase change material (PCM) is absorbed through one face of a porous board to increase the thermal capacity of the board. An expected application of this invention could bethe impregnation of a paraffin mix into gypsum wallboards to increase the inside thermal mass of buildings.

The process is applicable to several porous materials including cement, ceiling tiles and gypsum wallboards. In case of gypsum wallboards, the board could be a standard board or a board with fiberglass (the fiberglass is added to increase internal bond strength). Lab tests have shown that fiberglass acts as a barrier for the PCM, concentrating the PCM on the side of impregnation. If an increase of the board internal thermal conductivity is necessary, the board could contain metallic fibers. If an amount of PCM larger than what the board can retain is needed, the board could contain a wetting agent. If inflammability of the board does not meet standards for the application, a fire retardant could be added to the PCM or to the board during making. The paper on the absorption face could be the one used at the present time or a more porous paper or a perforated paper or a thinner paper or another type of porous film to increase the rate of absorption.

As a general rule, during the absorption operation, the temperature of the board has to be above the melting temperature of the PCM but under the maximum temperature that the board or PCM can reach without any deterioration or degradation of properties. In the case of a paraffin absorption into gypsum wallboards, the maximum temperature is about 95° C.; over this temperature there is a risk of deterioration of the interface gypsum-paper. Laboratory tests have also shown that the rate of paraffin absorption into gypsum wallboards increases when the board temperature is increased. Another possibility is to increase the temperature only on the absorption face to concentrate the PCM in this part of the volume. This could be made by radiant heating, by a quick cooling of the other side or using a hot PCM on a colder board. The temperature of the PCM has to be above its melting point and in many cases its viscosity is reduced while heated; this improves the rate of absorption.

If not micro-encapsulated, the PCM must be compatible with the material of the board. The PCM must not represent any risk for health and has to be chemically and physically stable over a long period. The necessary amount of PCM must be retainable by the board material and a wetting agent could be added, if necessary. A list of organic PCM with possible additives is given in U.S Pat. 4,797,160 by Salyer.

This suggests that, in an actual manufacturing process as presently practiced, the PCM absorption could be performed immediately after the boards exit or are removed from the drying oven (their temperature being at that moment about 90° C.)

When the PCM absorption operation is completed, the face of the board, through which the PCM has been absorbed, could remain as is or could be covered with a protective coating or material The surface could be covered with a paint or a varnish or a paper to prevent losses of PCM by evaporation and by capillarity with other materials in direct contact with the board. In the case of ceiling tiles and gypsum wallboards impregnated using the back surface, covering of the surface by an aluminum film could prevent heat loss or gain by radiation from inside the wall or ceiling, could prevent losses of the PCM, could prevent bacteriological deterioration of the PCM and could reduce the inflammability of the impregnated board.

One example of the method is the spray process as illustrated in FIG. 1, and it is adapted to a mass production for continuous operation. The board 1 is disposed on a moving conveyor belt 2 with the surface to be impregnated on top. The board enters a spray chamber 3 inside of which a uniform amount of liquid PCM 4 strikes the surface. The rate of liquid sprayed is less than the rate of absorption into the board to avoid liquid accumulation on the surface The amount of PCM impregnated into the board depends on the belt speed or on the spray chamber length. For instance, consider a spray chamber 15 m long and a spray rate of 1

L/m².min; to absorb 1.25 L/m² into boards the belt speed has to be 0.2 m/s.

Another similar process is shown in FIG. 2 wherein the sprayers are replaced by successive porous rolls 5 continuously fed with liquid PCM 6.

The flooding process shown in FIG. 3 is better adapted to a small scale production. The board 1 is disposed at level and has its surface to be impregnated on top. A grid 7 is placed on the surface to create separate small surfaces to flood with the desired amount of liquid PCM 8 released by jet nozzles of spouts 9.

Another possibility is to cover the surface to be impregnated with solid PCM or partially melted PCM when the board is hot or on cold board heated after. If the rate of melting is lower than the rate of absorption, no liquid accumulation will occur on the surface.

It is within the ambit of the present invention to cover any obvious modifications of the examples illustrated herein provided such modifications fall within the scope of the appended claims.

We claim:

1. A method of impregnating one side of a porous board with a precise amount of compatible phase change material, said method comprising applying a predetermined amount of said phase change material at a predetermined rate to said surface so that a predetermined amount of phase change material is impregnated, said rate being lower than the absorption rate of said phase change material, at least said one side of said board being at a temperature above the melting point of said phase change material during said impregnation.

2. A method as claimed in claim 1 wherein said method comprises:

(i) positioning a plurality of said porous boards spaced side by side on a conveyor with said one side facing up;
 (ii) conveying said boards through a spray chamber; and
 (iii) spraying said one side with a liquid phase change material.

3. A method as claimed in claim 2 wherein there is further provided the step of controlling the speed of said conveyor so that said spray rate is maintained lower than the absorption rate.

4. A method as claimed in claim 3 wherein at least said one side of said board is heated to above the melting point of said phase change material prior to spraying said phase change material thereon.

5. A method as claimed in claim 1 wherein said method comprises:

(i) positioning a board to be treated on a support surface at level with said one side facing up;
 (ii) placing a liquid restraining grid in contact with said one side; and
 (iii) applying a predetermined amount of liquid phase change material to separate confined areas of said grid to soak said one side.

6. A method as claimed in claim 1 wherein said method comprises heating at least said one side of said board and applying a solid phase change material to said one side of said board so that said material melts by the heat of said board and impregnates said one side.

7. A method as claimed in claim 1 wherein said method comprises applying a solid phase change material to said one side of said board and thereafter subjecting said board to heat to melt said material into said one side.

* * * * *